T. R. COOK.
TERMINAL STRUCTURE FOR ELECTRIC BATTERIES.
APPLICATION FILED MAR. 10, 1920.
1,372,603.
Patented Mar. 22, 1921.
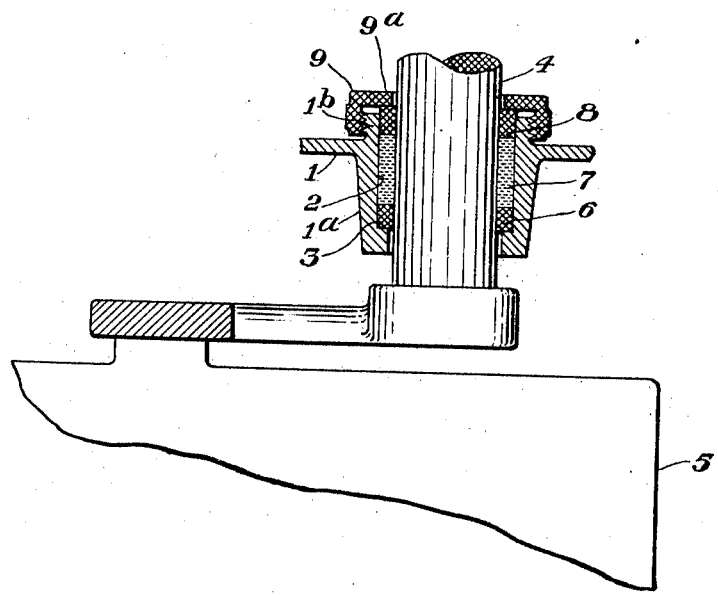
Thomas R. Cook,
INVENTOR,
BY A. L. Vencill
His ATTORNEY.

UNITED STATES PATENT OFFICE.

THOMAS R. COOK, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

TERMINAL STRUCTURE FOR ELECTRIC BATTERIES.

1,372,603.

Specification of Letters Patent.

Patented Mar. 22, 1921.

Application filed March 10, 1920. Serial No. 364,794.

*To all whom it may concern:*

Be it known that I, THOMAS R. COOK, a citizen of the United States, residing at Pittsburgh, in the county of Allegheny and State of Pennsylvania, have invented certain new and useful Improvements in Terminal Structures for Electric Batteries, of which the following is a specification.

My invention relates to electric batteries, and particularly to terminal structures for such batteries. The invention is particularly well adapted for, though not limited to, batteries of the secondary or storage type.

One object of my invention is the provision of an improved means for preventing the escape of the battery liquid at the terminal.

I will describe one form of terminal structure embodying my invention, and will then point out the novel features thereof in claims.

The accompanying drawing is a view showing in vertical section one form of terminal structure embodying my invention.

Referring to the drawing, the reference character 1 designates the cover of a battery cell, which cover is provided with a depending socket $1^a$ and an upstanding flange $1^b$. Extending through the socket and flange is a round aperture 2 at the bottom of which is an internal flange 3. Passing through the aperture 2 is a terminal post 4, the lower end of which is attached in suitable manner to one of the sets of battery plates 5. It will be observed that there is an appreciable amount of clearance between the post 4 and the flange 3.

Sleeved on the post 4 is a metallic ring 6 which rests against the flange 3. Surrounding the post above this ring is a gasket 7 of suitable material such as soft rubber, and above the gasket is a second metallic ring 8. The external diameter of each ring and the gasket is such that these parts fit in the aperture 2 with little or no clearance, but that they may be readily inserted therein and removed therefrom. The upper ring 8 is preferably located within the flange $1^b$ as shown.

The outer surface of flange $1^b$ is threaded to receive a follower nut 9, which nut is provided with an internal flange $9^a$ arranged to engage the upper ring 8. It will be seen that by screwing the follower 9 downwardly on the flange $1^b$ the ring 8 will be driven downwardly, thereby compressing the gasket 7 between this ring and the lower ring 6. The result of this compression is to force the gasket 7 into engagement with the post 4 and the wall of the aperture 2 with a considerable amount of pressure, thereby effectively preventing the escape of battery liquid through the aperture 2.

The function of the lower ring 6 is to prevent the gasket 7 from being forced through the annular space between the post 4 and the flange 3.

To assemble the structure, the ring 6, gasket 7 and ring 8 are placed on the post 4 in the order named, and the follower 9 is then screwed downwardly until the desired pressure on the gasket is attained. The gasket 7 may be renewed by merely removing the follower 9 and the ring 8, and it will be noted that this renewal does not result in the damage to any part of the structure.

Although I have herein shown and described only one form of terminal structure embodying my invention, it is understood that various changes and modifications may be made therein within the scope of the appended claims without departing from the spirit and scope of my invention.

Having thus described my invention, what I claim is:

1. In an electric battery, a cell cover having an aperture provided with an internal flange, a terminal post passing through said aperture, a ring of rigid material sleeved on said post and resting on said flange, an annular gasket sleeved on said post above said ring, a second ring of rigid material sleeved on said post above said gasket, and means coöperating with said cell cover for forcing said second ring downwardly so that the gasket is compressed between said two rings.

2. In an electric battery, a cell cover having an aperture provided with an internal flange, a terminal post passing through said aperture, a ring of rigid material sleeved on said post and resting on said flange, an annular gasket sleeved on said post above said ring, a second ring of rigid material sleeved on said post above said gasket, an annular projection on the upper surface of said cell cover concentric with said aperture and provided with screw threads on its outer surface, and a follower screwed on said projection to drive said second ring downwardly so that the gasket is compressed between said two rings.

3. In an electric battery, a cell cover having an aperture provided with an internal flange, a terminal post passing through said aperture with clearance between the post and said flange, a ring of rigid material sleeved on said post and resting on said flange, an annular gasket sleeved on said post above said ring, a second ring of rigid material sleeved on said post above said gasket, the external diameters of said gasket and rings being substantially the same as the diameter of said aperture, and means coöperating with said cell cover for forcing said second ring downwardly so that the gasket is compressed between said two rings.

4. In an electric battery, a cell cover having an aperture provided with an internal flange, a terminal post passing through said aperture, a ring of comparatively rigid material sleeved on said post and resting on said flange, an annular gasket of readily compressible material such as soft rubber sleeved on said post above said ring, a second ring similar to the first and sleeved on said post above said gasket, and means coöperating with said cell cover for forcing said second ring downwardly so that said gasket is compressed between the two rings.

In testimony whereof I affix my signature.

THOMAS R. COOK.